No. 848,955. PATENTED APR. 2, 1907.
G. L. BARTLETT.
MOLD.
APPLICATION FILED MAY 28, 1906.
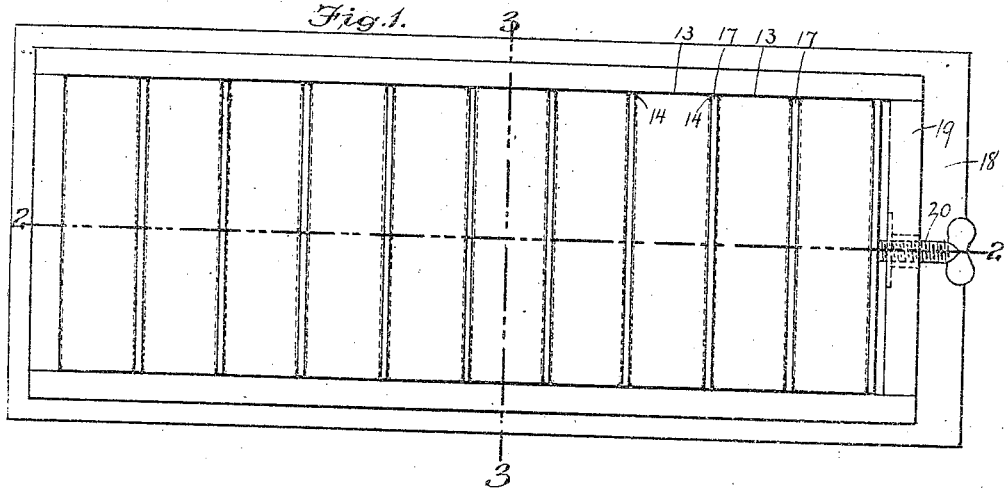
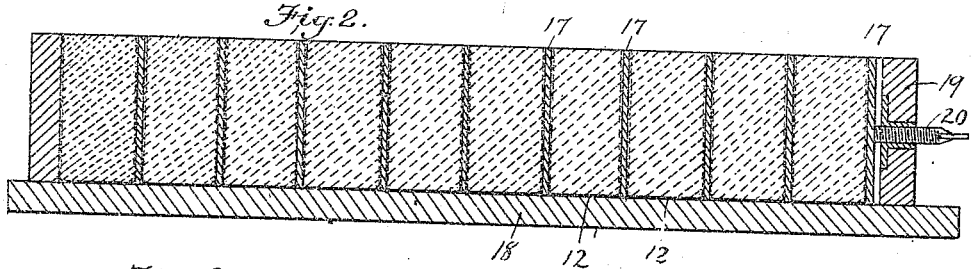
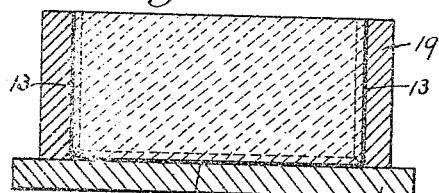
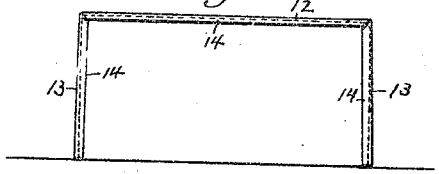
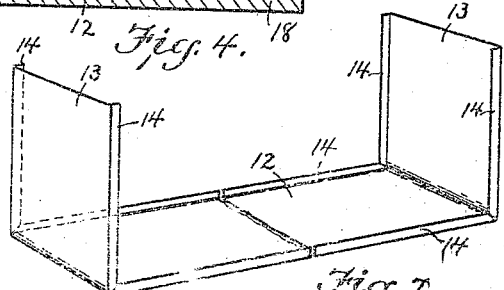
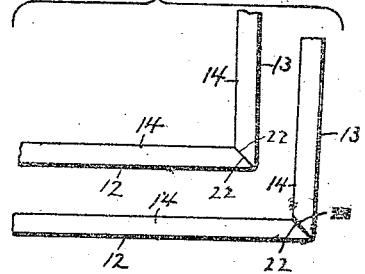
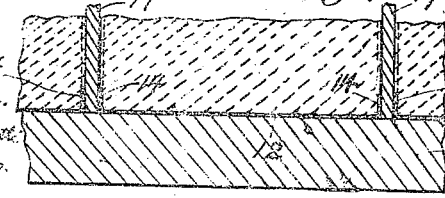

UNITED STATES PATENT OFFICE.

GEORGE LEON BARTLETT, OF MATTAPAN, MASSACHUSETTS.

MOLD.

No. 848,955.     Specification of Letters Patent.     Patented April 2, 1907.

Application filed May 26, 1906. Serial No. 319,021.

*To all whom it may concern:*

Be it known that I, GEORGE LEON BARTLETT, of Mattapan, in the county of Norfolk and State of Massachusetts, have invented certain new and useful Improvements in Molds, of which the following is a specification.

This invention relates to molds for forming plastic material into bodies of rectangular or other shape, and especially to molds for making bricks.

The invention has for its object to provide a mold adapted to be used in making bricks or other rectangular bodies from concrete, the mold embodying my invention being devised with especial reference to economy and durability of construction and to the formation of one or more smooth or glossy faces on each brick.

The invention consists in the improvements which I will now proceed to describe and claim.

Figure 1 represents a top plan view of a mold embodying my invention. Fig. 2 represents a section on line 2 2 of Fig. 1. Fig. 3 represents a section on line 3 3 of Fig. 1. Fig. 4 represents a perspective view of one of the mold members shown in the preceding figures. Fig. 5 represents an edge view of the mold member shown in Fig. 4. Fig. 6 represents in separate sectional views a portion of the mold member shown in Figs. 4 and 5. Fig. 7 represents an enlargement of a portion of Fig. 2.

The same letters of reference indicate the same parts in all the figures.

My improved mold comprises a series of angular members, each of which is composed of a central portion 12 and end portions 13 13, flexibly connected with the central portion and standing substantially at right angles therewith, the whole presenting three molding-faces adapted to form one of the edges and two of the ends of a concrete brick. The said angular member is preferably composed of a single strip of resilient sheet metal, which is bent to form the end portions 13, the latter being flexibly connected with the central portion 12 by the material of the strip. Narrow flanges 14 are formed on the edges of the portions 12 and 13, the inner sides of said flanges constituting narrow extensions of the mold-faces. The molding-surfaces of the portions 12 and 13 and the flanges 14 are rendered smooth or glossy in any suitable way, so that they form correspondingly smooth and glossy surfaces on concrete bricks made by the aid of the said angular mold member. It will be seen that by making the angular mold member of a strip of flexible sheet metal which is bent to form the end portions 13 and the flanges 14 slightly-rounded corners are formed on the brick, the slight rounding of the corners being due to the bending of the sheet metal to form the end portions and flanges of the angular mold. These rounded corners are very desirable, because they are free from the liability of being broken away, which would exist if the corners had sharp and well-defined angles. The faces of the angular mold may be coated with any suitable material to make them glossy. For example, the said faces may be coated with japan or other material adapted to be cured by baking, or they may be provided with a coating of fusible enamel or treated in any other way to produce the desired result. The metal of the strip from which the angular mold is made may be burnished or otherwise treated to form a glossy surface without the addition of a coating.

The above-described mold members constitute parts of a mold which is completed by assembling the said angular members in a holder and interposing between them a series of flat mold members or plates 17, the latter forming the sides of the mold-cavities. The said holder includes a base 18 and a frame 19, adapted to rest loosely on the base and to surround the series of angular and flat mold members, the said frame having at one end a clamping-screw 20.

In assembling the parts of the mold the frame 19 is placed upon the base 18 and the angular mold members are inserted in the frame, their central portions 12 resting on the base and their end portions 13 projecting upwardly and bearing against the sides of the frame. The flat mold members 17 are interposed between the angular mold members, the said flat members being formed to extend across the frame. The outer sides of the flanges 14 of the angular members bear against the flat members 17, as shown in Fig. 7. When the mold members are all in place in the holder, the screw 20 is turned to take up any looseness between the members, the mold being thus completed. The concrete or other plastic material is then inserted in the mold-cavities and allowed to remain therein until the molded material has sufficiently hardened to permit removal. The mold members and their contents may be removed from the holder and laid aside during the period required for setting or hardening, the holder—viz., the base 18 and the frame 19—being used again with another set of mold members.

The separation of the mold members and their contents from the holder may be conveniently effected by inverting the holder, loosening the screw 20, and raising the holder from the mold members and the bricks contained therein. This operation leaves the central portions 12 of the angular mold members on the top edges of the bricks, the end portions 13 projecting downwardly on the ends of the bricks and being caused to adhere thereto by atmospheric pressure. When the bricks have hardened sufficiently, the angular mold members are removed by springing their end portions 13 outwardly from the ends of the brick. This operation slightly bends the central portion 12, forming crevices between it and the edge of the brick on which it rests, so that air immediately rushes in and overcomes the holding effect of atmospheric pressure, so that the angular mold member readily cleaves from the brick. I prefer to form the angular mold member so that its ends portions normally stand at a somewhat obtuse angle relatively to the central portion.

In assembling the mold members the end portions are sprung inwardly to positions at right angles with the central portion. The tendency of the end portions to spring outwardly facilitates the disengagement of the angular member from the brick. The flanges 14, besides constituting extensions of the glossy-forming surfaces of the angular mold member, also prevent the escape of water from the face of the brick that is formed by contact with the central portion 12, the flanges on said central portion forming dams which retain the water that gravitates to the said face, the water being held by the flanges during the setting of the concrete and preventing the liability of the formation of minute holes or pits in the formed surface of the brick. The flanges 14 are provided with beveled meeting ends 22, which are separated when the end portions 13 spring outwardly to their normal position and are brought together to form a practically watertight joint when the end portions 13 are sprung inwardly at right angles with the central portion 12, all as illustrated in Fig. 6. The flanges 14 are preferably slightly inclined crosswise, so that their outer edges are somewhat farther apart than their bases, this form enabling them to be readily separated from the brick.

While I have described the angular mold member as provided with glossy-forming faces, I do not limit myself thereto, as the forming-faces of the angular member may be relatively rough or made without reference to the formation of glossy surfaces on the brick. It is obvious that my improved mold may be used in the manufacture of brick from clay, &c.

I claim—

1. An angular mold member comprising a central portion and end portions projecting therefrom and flexibly connected therewith, said portions having edge flanges constituting narrow extensions of the molding-surfaces.

2. An angular mold member composed of a resilient strip having a flanged central portion and flanged end portions projecting therefrom, and flexibly connected therewith, the flanges of said portions having beveled ends which meet when the end portions are in their operative positions.

3. A mold comprising a series of angular mold members, each having a flanged central portion and flanged end portions flexibly connected therewith, a series of flat mold members adapted to be interposed between adjacent angular members, and a holder adapted to receive the two series of members, and provided with means for clamping the members together.

4. A mold comprising alternating angular and flat mold members separable from each other, and means for detachably securing said members in their operative positions.

5. A mold comprising alternating angular and flat mold members separable from each other, and a frame formed to receive said members, and having means for pressing the members together.

In testimony whereof I have affixed my signature in presence of two witnesses.

GEORGE LEON BARTLETT.

Witnesses:
W. W. DOWNS,
C. F. BROWN.